(12) United States Patent  (10) Patent No.: US 7,786,380 B2
Anderson  (45) Date of Patent: Aug. 31, 2010

(54) WALL PLATE WITH A MULTIPLE FLEXIBLE MEMBER COVERED OPENING

(75) Inventor: Erik D. Anderson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 12/128,053

(22) Filed: May 28, 2008

(65) Prior Publication Data

US 2009/0294148 A1   Dec. 3, 2009

(51) Int. Cl.
*H02G 3/14* (2006.01)
(52) U.S. Cl. .................. 174/66; 174/67; 220/241; 439/139
(58) Field of Classification Search ............ 174/66, 174/67; 220/241, 242; 439/139; D13/177, D13/156
See application file for complete search history.

(56) References Cited

U.S. PATENT DOCUMENTS

| 5,356,311 | A | 10/1994 | Liu |
| 6,989,489 | B1 | 1/2006 | Savicki, Jr. |
| 7,211,727 | B2 | 5/2007 | Pearse et al. |
| 7,495,171 | B2 * | 2/2009 | Gorin et al. ............. 174/66 |
| 7,576,285 | B1 * | 8/2009 | Savicki, Jr. ............. 174/66 |
| 7,589,279 | B2 * | 9/2009 | Haynes et al. ........... 174/67 |

* cited by examiner

*Primary Examiner*—Dhiru R Patel
(74) *Attorney, Agent, or Firm*—Suiter Swantz pc llo

(57) ABSTRACT

The present disclosure is a wall plate with a multiple flexible member covered opening. A wall plate with a multiple flexible member covered opening may allow for multiple types of wires to run through the same wall box and wall plate. Wall plate may be designed to directly attach to a standard single gang wall box for an easy installation. Wall plate may include multiple flexible members that may allow cables to enter and exit through the flexible members while covering an opening defined by a frame of the wall plate to provide a finished appearance.

1 Claim, 3 Drawing Sheets

US 7,786,380 B2

WALL PLATE WITH A MULTIPLE FLEXIBLE MEMBER COVERED OPENING

TECHNICAL FIELD

The present disclosure generally relates to the field of cable management, and more particularly to a wall plate with a multiple flexible member covered opening.

BACKGROUND

With the recent surge in flat panel televisions, more and more people are moving towards replacement of conventional televisions with flat panel televisions. This has also led to a huge demand for mounting these televisions directly on the wall. Unfortunately, these flat panel televisions still require multiple wires connected from various components, such as a digital video disk (DVD) player, game player, cable box and the like to the television.

The wires may be run outside the wall, however; this is visually unappealing. While there are many wall plates available for specific types of wires, the use of multiple wall plates for each type of wire is burdensome. Additionally, a wire raceway may guide wires from the various components to one another, but is aesthetically unappealing as there will be a structure running between the components.

SUMMARY

The present disclosure is directed to a wall plate with a multiple flexible member covered opening. A wall plate with a multiple flexible member covered opening may allow for multiple types of wires to run through the same wall box and wall plate. The wall plate may be designed to directly attach to a standard single gang wall box for easy installation. Wall plate may include multiple flexible members that may allow wires and cables to enter and exit through the flexible members while covering an opening defined by a frame of the wall plate to provide a finished appearance.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1:
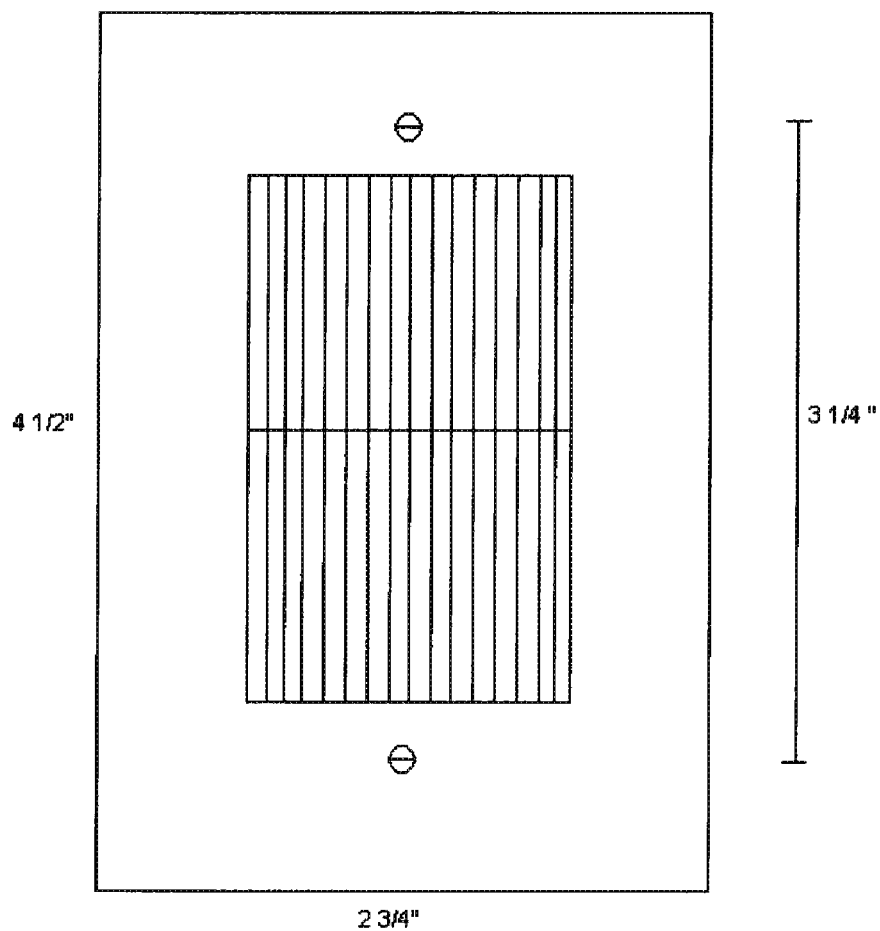
FIG. 1 is a front view illustrating a wall plate in accordance with an embodiment.

Referring to FIG. 1, a front view illustrating a wall plate 100 in accordance with an embodiment is shown. Wall plate 100 may include a frame 110 and may include a first collection of flexible members 120 and a second collection of flexible members 130. Frame 110 may be constructed of a rigid material, such as plastic, steel and the like. Frame 110 may represent a rectangular shape with four exterior sides and four interior sides.

It is contemplated that wall plate 100 may be operable with a standard gang wall box. For example, frame 110 may include apertures 140, 150 for attachment of the wall plate to the wall box. In an embodiment, apertures may be placed 3¼ inches apart to correlate with a standard wall box. It is contemplated that wall plate may be manufactured according to various dimensions and specifications. For example, wall plate may be manufactured to cover a double gang wall box. It is further contemplated that wall plate may also be presented in ornamental designs and shapes rather than a conventional rectangular design.

A first collection of flexible members 120 may comprise a plurality of flexible members. Flexible members of the first collection of flexible members may be elongated, and may comprise a first end 122 and a second end 124. Each flexible member of the first collection of flexible members may be coupled to a first interior side 160 of the frame 110 at the first end of the flexible members. A second collection of flexible members 130 may comprise a plurality of flexible members. Flexible members of the second collection of flexible members may also be elongated, and may comprise a first end 132 and a second end 134. Each flexible member of the second collection of flexible members 130 may be coupled at the first end 132 to a second interior side 170 of the frame 110.

Flexible members may include a flexible material, such as plastic, foam, cloth and the like. Wall plate 100 may provide maximum flexibility in a minimal amount of space. Wall plate 100 may provide flexibility regarding the types of wires required for a given installation, both now and in the future. For example, RCA, HDMI, speaker, component, and S-video cables could all run through the same opening of wall plate 100. If a new standard is developed in the future, those types of cables may also be run through wall plate 100.

The first collection of flexible members and second collection of flexible members may allow cables to enter and exit through wall plate 100. Wall plate 100 may provide a finished appearance. For example, flexible members may be provided in different colors to match a frame color, or a color of a wall. For example, white flexible members may be employed with a white frame, but black flexible members may be employed with a stainless steel frame.

It is contemplated that wall plate 100 may comprise multiple layers of collections of flexible members. For example, a first layer of collections of flexible members may be oriented in a first direction and a second layer of collections of flexible members may be oriented in a perpendicular direction to the first direction. Multiple layers of flexible members may provide maximum coverage of the opening of the wall plate opening without impeding the entry or exit of the wires to and from wall plate 100.

Figure 2:
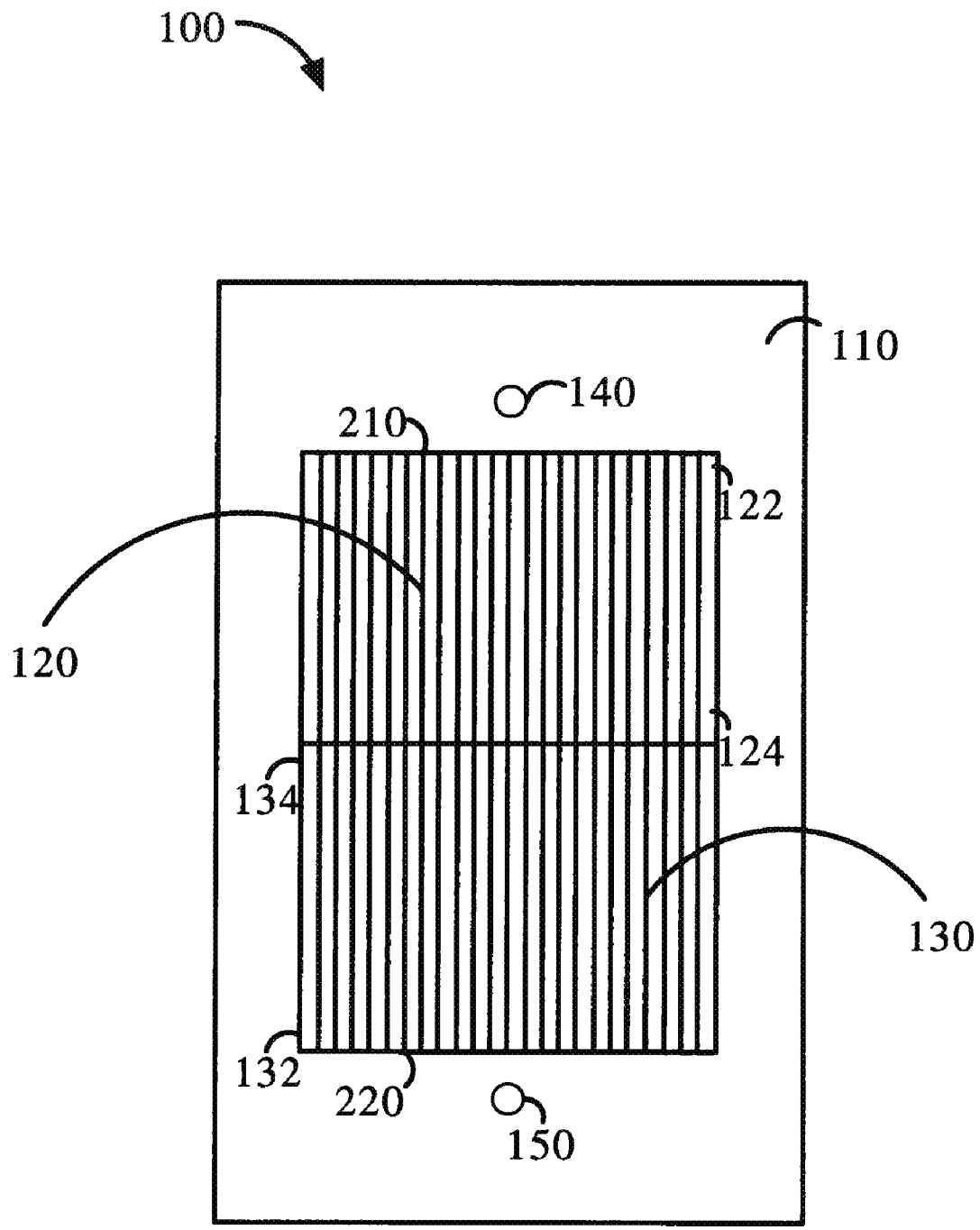
FIG. 2 is a front view illustrating a wall plate in accordance with an alternative embodiment.

It is contemplated that collections of flexible members may be oriented within the frame of a wall plate in a variety of fashions. As shown in FIG. 1, wall plate 100 may include a first collection of flexible members may be coupled to a first interior side (e.g. a left side) while the second collection of flexible members may be coupled to a second interior side (e.g. a right side). Referring to FIG. 2, a front view illustrating a wall plate in accordance with an alternative embodiment is shown. Wall plate of FIG. 2 may include a first collection of flexible members may be coupled to a first interior side 210

(e.g. a top side) while the second collection of flexible members may be coupled to a second interior side 220 (e.g. a bottom side).

Figure 3:
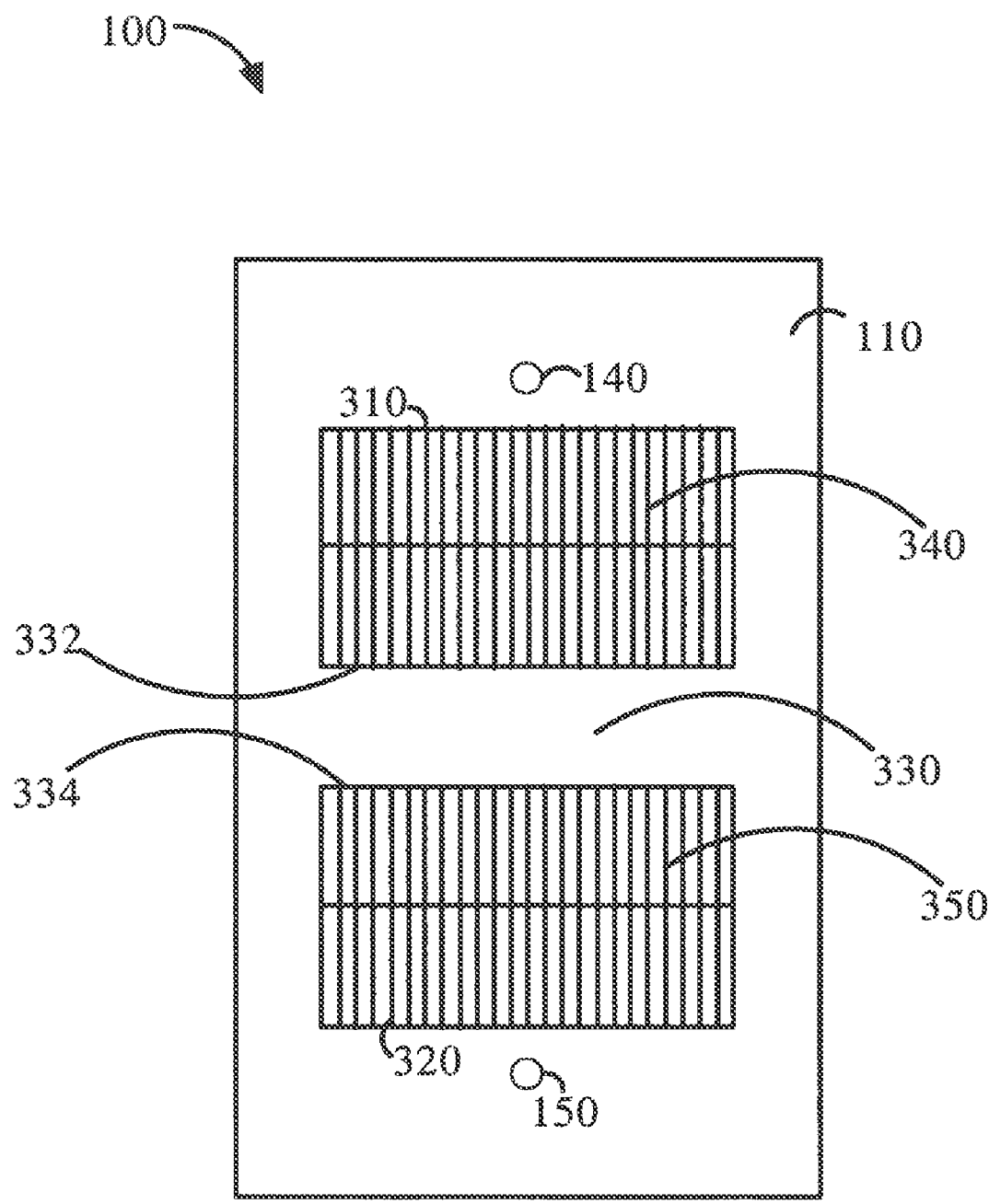
FIG. 3 is a front view illustrating a wall plate in accordance with a second alternative embodiment.

Referring to FIG. 3, a front view illustrating a wall plate in accordance with a second alternative embodiment is shown. Wall plate may include a frame and four collections of flexible members whereby a first collection of flexible members is coupled to a top side 310, a second collection is coupled to a bottom side 320, and the third and four collections of flexible members are coupled to a mid-level frame portion 330. It is further contemplated that other orientations of collections of flexible members may be employed by those with ordinary skill in the art without departing from the scope and intent of the present invention.

It is contemplated that wall plate 100 may include a frame 110. Frame 110 may include at least two apertures 140, 150 suitable for coupling with a gang wall box. Frame 110 may include a rigid material. Frame 110 may further include a first opening 340 and a second opening 350 defined by a top side 310, a bottom side 320 and a mid-level frame portion 330. The mid-level frame portion 330 may include a first side 332 and a second side 334.

Wall plate 100 may further include a first collection of flexible members, a second collection of flexible members, a third collection of flexible members and a fourth collection of flexible members. The first collection of flexible members, the second collection of flexible members, the third collection of flexible members and the fourth collection of flexible members may include a first layer of the flexible members and a second layer of the flexible members with each flexible member of the first collection of flexible members, the second collection of flexible members, the third collection of flexible members and the fourth collection of flexible members including a first end and a second end.

It is contemplated that the first layer of the flexible members of the first collection of the flexible members may be oriented in a vertical direction and the second layer of the flexible members of the first collection of the flexible members may be oriented in a horizontal direction with the first end of each flexible member of the first layer of the first collection of flexible members being coupled to the top side 310 of frame 110. The first layer of the flexible members of the second collection of the flexible members may be oriented in the vertical direction and the second layer of the flexible members of the second collection of the flexible members may be oriented in the horizontal direction with the first end of each flexible member of the first layer of the second collection of the flexible members being coupled to the first side 332 of the mid-level frame portion 330 of frame 110. The first layer of the flexible members of the third collection of the flexible members may be oriented in the vertical direction and the second layer of the flexible members of the third collection of the flexible members may be oriented in the horizontal direction with the first end of each flexible member of the first layer of the third collection of the flexible members being coupled to the second side 334 of the mid-level frame portion 330 of frame 110. The first layer of the flexible members of the fourth collection of the flexible members may be oriented in the vertical direction and the second layer of the flexible members of the fourth collection of the flexible members may be oriented in the horizontal direction with the first end of each flexible member of the first layer of the fourth collection of the flexible members being coupled to the bottom side 320 of frame 110.

While FIGS. 1-3 depict flexible members as generally straight and of a similar length, it is contemplated that flexible members may be constructed of various shapes, widths and lengths amongst the collections of flexible members without departing from the scope or intent of the disclosure.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A wall plate, comprising;
   a frame, said frame including at least two apertures suitable for coupling with a gang wall box, said frame including a rigid material, said frame including: a first opening and a second opening defined by a top side, a bottom side and a mid-level frame portion, the mid level portion including a first side and a second side; and
   a first collection of flexible members, a second collection of flexible members, a third collection of flexible members and a fourth collection of flexible members;
   the first collection of flexible members, the second collection of flexible members, the third collection of flexible members and the fourth collection of flexible members including a first layer of said flexible members and a second layer of said flexible members, each flexible member of the first collection of flexible members, the second collection of flexible members, the third collection of flexible members and the fourth collection of flexible members including a first end and a second end;
      said first layer of said flexible members of said first collection of said flexible members being oriented in a vertical direction and said second layer of said flexible members of said first collection of said flexible members being oriented in a horizontal direction, said first end of each flexible member of said first layer of said first collection of flexible members being coupled to said top side of said frame;
      said first layer of said flexible members of said second collection of said flexible members being oriented in said vertical direction and said second layer of said flexible members of said second collection of said flexible members being oriented in said horizontal direction, said first end of each flexible member of said first layer of said second collection of said flexible members being coupled to said first side of the mid-level frame portion of said frame;
      said first layer of said flexible members of said third collection of said flexible members being oriented in said vertical direction and said second layer of said flexible members of said third collection of said flexible members being oriented in said horizontal direction, said first end of each flexible member of said first layer of said third collection of said flexible members being coupled to said second side of the mid-level frame portion of said frame; and said first layer of said flexible members of said fourth collection of said flexible members being oriented in said vertical direction and said second layer of said flexible members of said fourth collection of said flexible members being oriented in said horizontal direction, said first end of each flexible member of said first layer of said fourth collection of said flexible members being coupled to said bottom side of said frame.

* * * * *